United States Patent [19]

Savage et al.

[11] 4,286,972
[45] Sep. 1, 1981

[54] VAPOR PHASE ADSORPTION USING NONSTOICHIOMETRIC CARBON-SULFUR COMPOUNDS

[75] Inventors: David W. Savage, Summit; Chin H. Chang, Edison; John M. Longo, New Providence, all of N.J.

[73] Assignee: Exxon Research & Engineering Co., Florham Park, N.J.

[21] Appl. No.: 866,211

[22] Filed: Jan. 3, 1978

[51] Int. Cl.$^3$ ............................................. B01D 53/04
[52] U.S. Cl. .......................................... 55/58; 55/62; 55/74
[58] Field of Search ................... 55/59, 62, 68, 73, 74, 55/58

[56] References Cited

U.S. PATENT DOCUMENTS

| | | | |
|---|---|---|---|
| 2,823,765 | 2/1958 | Maslan | 55/74 X |
| 3,470,677 | 10/1969 | Eck et al. | 55/73 |
| 3,596,438 | 8/1971 | Beukenkamp et al. | 55/74 X |
| 3,634,028 | 1/1972 | Hohne | 55/73 X |
| 3,660,967 | 5/1972 | Collins et al. | 55/73 |
| 3,844,739 | 10/1974 | Alfrey, Jr. | 55/74 |

OTHER PUBLICATIONS

Puri et al., "Carbon-Sulphur Surface Complexes on Charcoal", Carbon, vol. 9, pp. 123-134, Pergamon Press, G. Britain, 1971.
Lovett et al., "Air Pollution Control Techniques: Air Pollution Control by Activated Carbon", Chem. Eng. Prog., vol. 70, No. 5, pp. 43-47, 1974.
Grant et al., "Adsorption of Normal Paraffins and Sulfur Compounds on Activated Carbon", AICHE Journal, vol. 8, No. 3, pp. 403-406, 1962.
Rowson, "Fluid Bed Adsorption of Carbon Disulphide", British Chemical Engineering, Mar., 1963.
Sawyer et al., "Adsorption of Solvent Vapors on Commercial Activated Carbon", Ind. & Eng. Chem., vol. 36, No. 10, p. 894, 1944.
Enneking, "How Activated Carbon Recovers Gas Liquids", Hydro-Carbon Processing, vol. 45, No. 10, pp. 189-192, 1966.
Siedlewski et al., "Changes in Texture & Sorption Capacity of Activated Carbons", Przemysl Chemiczny", vol. 55, No. 8, pp. 411-414, 1976.
Blayden et al., "Solid Complexes of Carbon and Sulphur", Carbon, vol. 5, pp. 533-544, Pergamon Press Ltd., G. Britain, 1967.

Primary Examiner—Robert H. Spitzer
Attorney, Agent, or Firm—John W. Ditsler; Edward H. Mazer

[57] ABSTRACT

Nonstoichiometric carbon-sulfur compounds have been found to be effective adsorbents for separating organic vapors from a gaseous mixture. Separation of aromatic compounds from gaseous mixtures is particularly effective using such compounds. The spent adsorbent may then be regenerated.

21 Claims, 3 Drawing Figures

VAPOR PHASE ADSORPTION USING NONSTOICHIOMETRIC CARBON-SULFUR COMPOUNDS

BACKGROUND OF THE INVENTION

1. Field of the Invention

In general, the present invention relates to a process for separating components from gaseous mixtures. More particularly, this invention relates to a process for removing organic vapors from a gas mixture by contact with non-stoichiometric carbon-sulfur compounds under adsorption conditions.

2. Description of the Prior Art

It has been suggested to remove components from gaseous mixtures by using activated carbon as an adsorbent. (See, for example, W. D. Lovett and F. T. Cunniff, "Air Pollution Control Techniques: Air Pollution Control By Activated Carbon", *Chemical Engineering Progress*, Vol. 70, No. 5, pp. 43–47, 1974; R. J. Grant et al, "Adsorption of Normal Paraffins and Sulfur Compounds on Activated Carbon", *AIChE Journal*, Vol. 8, No. 3, pp. 403–406, 1962; H. M. Rowson, "Fluid Bed Adsorption of Carbon Disulphide", *British Chemical Engineering*, March 1963; F. G. Sawyer and D. F. Othmer, "Adsorption of Solvent Vapors on Commercial Activated Carbon", *Industrial and Engineering Chemistry*, Vol. 36, No. 10, p. 894, 1944; and J. C. Enneking, "How Activated Carbon Recovers Gas Liquids", *Hydrocarbon Processing*, Vol. 45, No. 10, pp. 189–192, 1966, the disclosures all of which are incorporated herein by reference.)

However, conventional activated carbons have been observed to have several limitations. For example, desorption of certain compounds (e.g., aromatic hydrocarbons) therefrom is difficult due to the high binding energy of said materials on the carbon. As such, regeneration of the spent activated carbon adsorbent becomes expensive in that large amounts of stripping gas are required for desorption.

It has also been suggested to use nonstoichiometric carbon-sulfur compounds to adsorb water vapor (see B. R. Puri and R. S. Hazra, *Carbon*, Vol. 9, pp. 123–134, Pergamon Press, Great Britain, 1971 and J. Siedlewski and R. Majewski, *Przemysl Chemiczny*, Vol. 55, No. 8, pp. 411–414, 1976, the disclosures of which are incorporated herein by reference). Nevertheless, it is believed that the particular adsorption process described hereinbelow has not heretofore been disclosed.

SUMMARY OF THE INVENTION

Now, according to the present invention, it has been unexpectedly discovered that organic vapors can be removed from a gas mixture by contact with an adsorbent comprising nonstoichiometric carbon-sulfur compounds (abbreviated hereinafter as $C_xS$). Use of $C_xS$ as an adsorbent has the advantages of easier desorption of certain materials (e.g., aromatic compounds), low $C_xS$ loss and easier recovery of adsorbate relative to conventional activated carbons. Also, $C_xS$ is easily and inexpensively prepared. Spent $C_xS$ adsorbent may be regenerated thermally, by solvent extraction, by vapor stripping or by pressure reduction.

DETAILED DESCRIPTION OF THE INVENTION

Figure 1B:
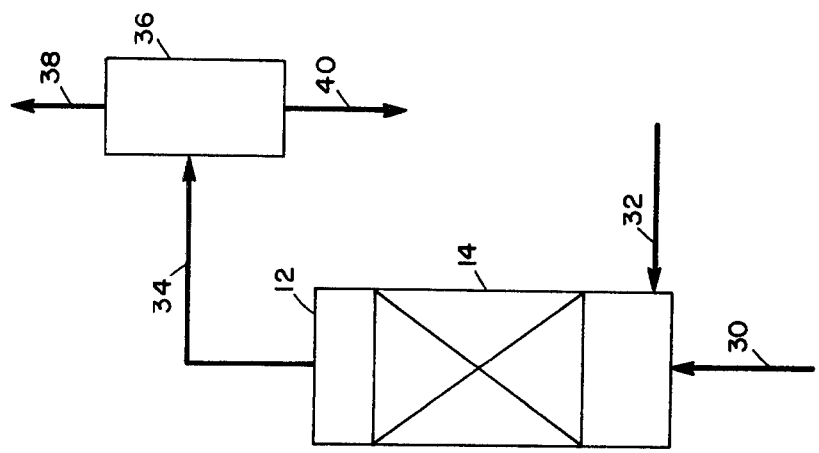
FIG. 1B shows a flow diagram for regenerating spent $C_xS$ adsorbent.

According to the present invention, organic vapors can be adsorbed from a gas mixture by contact with nonstoichiometric carbon-sulfur compounds of the formula $C_xS$. Such compounds may be prepared by a variety of techniques including reacting a carbonaceous material at elevated temperatures (e.g., between, say, 400° and 700° C.) with a sulfur-containing gas such as $H_2S$, $SO_2$, S and the like (see H. E. Blayden and J. W. Patrick, *Carbon*, Vol. 5, pp. 533–544, Pergamon Press Ltd., Great Britain, 1967; and B. R. Puri and R. S. Hazra, *Carbon*, Vol. 9, pp. 123–134, Pergamon Press, Great Britain, 1971, the disclosures of which are incorporated herein by reference). Suitable carbonaceous materials from which $C_xS$ may be prepared include coal chars, conventional activated carbons, petroleum fluid coke, sucrose char, various polymeric chars (e.g., polyvinylidene difluoride char) and the like. The value of x is not critical and may range broadly, e.g., from about 50 to about 4, which corresponds to from about 5 to about 40 wt. % sulfur. Preferably x will range between about 15 to about 4, which corresponds to from about 15 to about 40 wt. % sulfur. Most preferably, x will range between about 10 and about 4, which corresponds to from about 20 to about 40 wt. % sulfur. Also, x need not be an integer. $C_xS$ may be characterized as a surface compound of carbon with variable composition and no crystallinity. $C_xS$ is very stable (the sulfur being chemically bound) and is inert to acid, base and organic solvents—an exception being highly concentrated nitric acid.

The particular $C_xS$ compounds employed as an adsorbent in the present invention should be preferably in granular form. In addition, the $C_xS$ should have a surface area of at least 300, preferably at least 500, square meters per gram as measured by the Brunauer-Emmett-Teller equation for physical adsorption of nitrogen (i.e., the BET test). Normally the surface area will range between about 300 and about 2500, preferably between about 500 and about 1400, square meters per gram. The carbonaceous adsorbent should have a pore volume of at least 0.2, preferably at least 0.5, and more preferably at least 1.0, cubic centimeters per gram. Typically, the pore volume will range from about 0.3 to about 1.2 cubic centimeters per gram. The particle size of the carbonaceous adsorbent is also not critical and may range broadly. In general, the particle size will range from about 5 microns to about 1 centimeter. Preferably, it will range from about 48 (297 microns) to about 4 (4.76 mm), more preferably from about 12 (1.41 mm) to about 20 (841 microns), Tyler screen mesh.

The use of $C_xS$ as a vapor phase adsorbent has a wide variety of applications including recovery of volatile solvents, removal of sulfur compounds, purification of hydrogen and the like. In addition, a wide variety of organic vapors (or species) can be removed using $C_xS$. By organic vapors are meant gaseous or vaporous carbon-containing compounds or molecules. For example, in the case of solvent recovery, typical solvents that can be recovered include, but are not limited to, the following: hydrocarbons such as naphtha or petroleum ether; methyl, ethyl, isopropyl, butyl and other alcohols; chlorinated hydrocarbons such as carbon tetrachloride, ethylene dichloride and propylene dichloride; esters such as methyl, ethyl, isopropyl, butyl and amyl acetate; acetone, methyl ethyl ketone and other ketones; ethers; aromatic hydrocarbons such as benzene, toluene and xylene; carbon disulfide, phenolic hydrocarbons, nitrated hydrocarbons, and the like. It is preferred that the solvents have a normal boiling point less than 350° F. to facilitate their removal from the adsorbent during regeneration.

Similarly, $C_xS$ can be used to remove sulfur-containing compounds such as mercaptans, $CS_2$, COS, thiophene and the like from, say, natural and/or coal gas in preference to methane, ethane, $H_2$, $CO_2$ and $H_2S$. In like manner, light hydrocarbons (e.g., $C_1$-$C_3$) can be removed from the off-gas from a naphtha reformer to yield a purified hydrogen stream. $C_xS$ can also be used to remove propane and heavier hydrocarbons from, say, natural gas, and benzene from coke-oven gas. Further, odor producing impurities can be removed from air using $C_xS$.

In addition, the source of the gas mixture to be treated is essentially immaterial. For example, the gas mixture can be obtained from practically any source including petroleum refineries, petrochemical plants, synthetic fuels producing and/or process facilities (coal gasification and coal liquefaction plants), natural gas facilities, facilities utilizing solvents, miscellaneous manufacturing and industrial plants and the like. The mixture may be a product, by-product or waste stream from such facilities.

The amount of organic species present in the gas mixture is not critical to the practice of the present invention and may range broadly, depending upon various process and economic factors such as the amount of $C_xS$ employed, the degree of removal desired, the frequency of $C_xS$ regeneration, size of contacting zone, and the like. Thus, a gas mixture containing dilute (or concentrated) amounts of organic species can be suitably treated according to the present invention. Broadly speaking, the amount of such species in the mixture can range from, say, about 5 wppb to about 25 wt. % based on total weight of the gas mixture.

The temperatures and pressures employed during the adsorption of vapors are also not critical and can vary broadly, depending upon various economic and process factors, particularly the physical properties of the gas mixture being treated. However, it is important that the temperature and pressure be such that said gas mixture will be maintained substantially in the gas phase. Thus, the temperature for adsorption should be maintained relatively low but above the dew point of the particular gas mixture at the pressure employed. While the pressure can also range broadly (say from about 0 to about 3000 psia or more), the pressure will normally range from about 0 to about 1500 psia.

Similarly, the residence or contact time of the gas mixture with the $C_xS$ adsorbent is not critical and can also range broadly, depending on such factors as the amount of organic species present, the degree of removal desired and the like. While the residence time need be only that sufficient to effect removal of at least a portion of said organic species from the mixture, the residence time could vary up to say 30 minutes or more. Typically, however, the residence time will be less than five minutes, and, preferably, in the range of about 1 to 2 minutes.

Figure 1A:
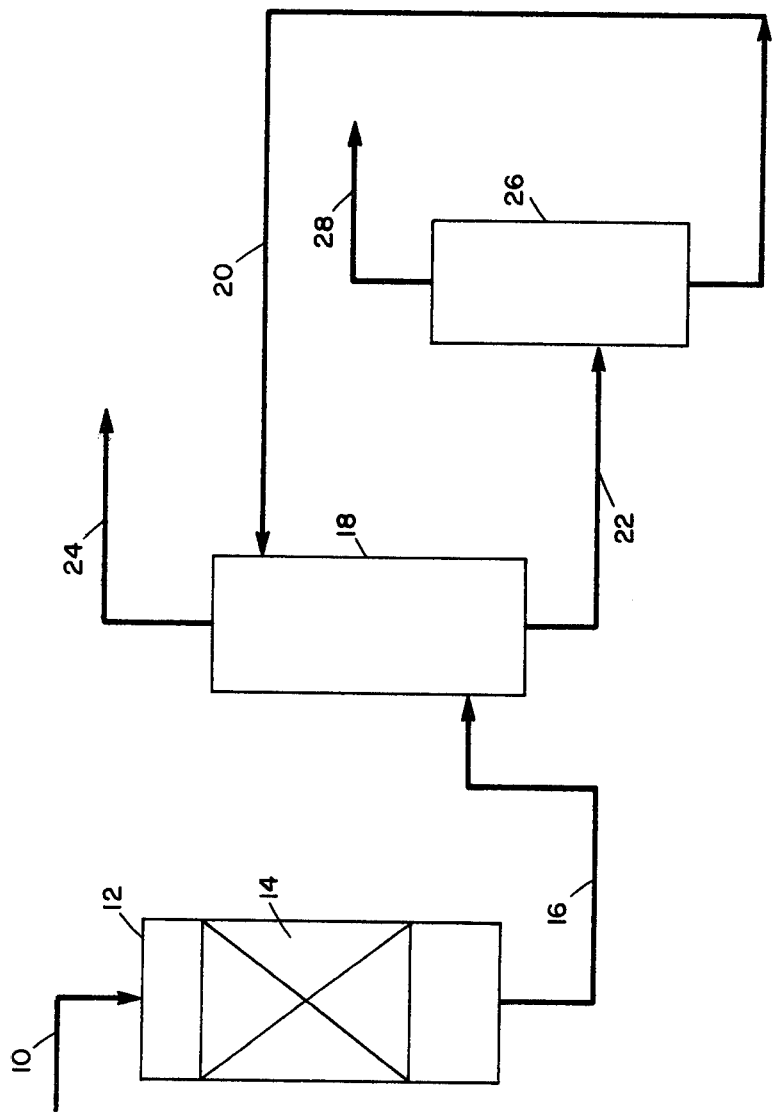
FIG. 1A shows a flow diagram of one embodiment of the present invention wherein natural gas contacts a bed of $C_xS$.

Having thus described the present invention in general terms, reference is now made to FIG. 1 which illustrates the use of $C_xS$ to remove $C_4^+$ hydrocarbons from natural gas prior to the gas contacting a solvent for removing acid gases (e.g., $CO_2$, $H_2S$, etc.) from said natural gas. This is important because such solvents tend to adsorb not only the acid gases, but the $C_4^+$ hydrocarbons as well. This results in not only a loss of hydrocarbons values, but the presence of said hydrocarbons will adversely affect the cnversion of the $H_2S$ removed into sulfur in, for example, a Claus plant.

It is to be understood that FIG. 1 is shown only in such detail as is necessary for a clear understanding of how the present invention may be applied to adsorb organic vapors from a gas mixture. No intention is made to unduly limit the scope of the present invention to adsorption of only $C_4^+$ hydrocarbons as variations obvious to those having ordinary skill in the art of gas adsorption processes are included within the broad scope of the present invention.

Referring to FIG. 1, there is shown a stream of natural gas being passed via line 10 into an adsorption zone 12 which contains a bed of $C_xS$ shown as 14. Although this particular embodiment shows the presence of only one bed of $C_xS$ in zone 12, more than one bed can be utilized. The natural gas—which typically contains methane, ethane, propane, heavier hydrocarbons (i.e., $C_4^+$ hydrocarbons) as well as acid gases such as $CO_2$, $H_2S$ and the like—is then passed downward through adsorption zone 12, coming into contact with progressively less exhausted $C_xS$. For this particular embodiment, the $C_4^{30}$ hydrocarbons are adsorbed by the $C_xS$ such that a natural gas stream having a reduced amount of $C_4^+$ hydrocarbons will be withdrawn and/or recovered from zone 12 via line 16. Preferably, a major portion of said materials is removed from the natural gas. Most preferably, the effluent gas from zone 12 is substantially depleted in $C_4^+$ hydrocarbons. By substantially depleted is meant that at least 80%, preferably at least 90%, and more preferably at least 95% of the $C_4^+$ hydrocarbons present in the natural gas entering adsorption zone 12 are removed therefrom. If desired, the gas may be passed upflow rather than downflow. Plugging of the $C_xS$ bed can be prevented by eliminating any sources of $C_xS$ attrition and/or providing an adequate filter prior to adsorption zone 12.

The effluent gas from zone 12 then passes via line 16 into an acid gas absorption zone 18 where it contacts solvent (introduced via line 20) such as 2,2,4,4-tetrahydrothiophene dioxide which is suitable for removing the acid gases ($CO_2$, $H_2S$, etc.) present therein. There results from absorption zone 18 an extract phase 22 comprising solvent and acid gases and a raffinate phase 24 comprising natural gas depleted in both $C_4^+$ hydrocarbons and said acid gases. The solvent in the extract phase can then be regenerated in a solvent regeneration zone 26 by removal of said acid gases which may then be passed via line 28 to a sulfur production plant. If desired, the regenerated solvent may be recycled to absorption zone 18 via line 20. The $C_4^+$ hydrocarbons can then be recovered during regeneration of the $C_xS$. The process conditions and apparatus used in absorption zone 18 and solvent regeneration zone 26 do not form part of the present invention and may be readily selected by one skilled in the art.

C$_x$S can be used as an adsorbent alone or in combination with one or more beds of conventional activated carbon. For example, a bed of C$_x$S could be placed prior to a bed of activated carbon. In this particular embodiment, the bed of C$_x$S acts as a guard chamber to remove those species (e.g., aromatic hydrocarbons) that are adsorbed more strongly on conventional activated carbon. This will enable easier regeneration of the conventional carbon by the techniques described below.

During contact with the C$_x$S adsorbent, the gas mixture becomes depleted in the organic species by adsorption of same on the C$_x$S such that the C$_x$S becomes spent (i.e., at least a portion, typically a major portion of its adsorptive capacity becomes exhausted) and must be regenerated for further use. However, the particular point at which the C$_x$S is considered to be spent depends not only on its ability (i.e., capacity) to remove gaseous components, but also on economic considerations. For example, it may be desirable to regenerate C$_x$S whose adsorptive capacity is only mildly reduced to essentially fresh adsorptive capacity rather than allow its adsorptive capacity to be reduced to a much lower level and then be regenerated to fresh or less than fresh adsorptive capacity. Therefore, as used herein, the terms "regeneration" or "regenerated" mean recovering C$_x$S that possesses greater capacity to adsorb organic vapors than that possessed by the C$_x$S removed from the adsorption process. It should be understood that the following discussion relating to removing specific organic species from the adsorbent is only illustrative, as the particular regeneration techniques described herein are equally applicable to removing broad classes of organic vapors.

While the C$_x$S may be regenerated ex situ, in situ regeneration is shown in FIG. 1B. In one embodiment, organic vapors can be removed from a bed of C$_x$S by contact with a liquid solvent, which is shown being passed via line 30 into zone 12. Since the concentration of adsorbed species in the liquid solvent is less than that present on the C$_x$S, they are desorbed or displaced by extraction into said solvent.

The particular liquid solvent employed is not critical and can range broadly depending upon the adsorbed species. Suitable liquid solvents include branched hydrocarbons, linear hydrocarbons, cyclic hydrocarbons, aromatic hydrocarbons or mixtures thereof. Generally, it is preferred that the hydrocarbon solvent be non-polar. It is also preferred that the liquid solvent be able to readily solubilize the adsorbate while being only weakly adsorbed onto the C$_x$S; i.e., having a low adsorptivity (i.e., low binding energy) on the C$_x$S adsorbent. By way of illustration, a comparison of various hydrocarbon solvents is presented in Table 1 below, which is excerpted from N. N. Avgull and A. V. Kiseselev, Chapter 1, in *Chemistry and Physics of Carbon,* Vol. 6, edited by P. L. Walker, Jr., Marcel Decker, pp. 39-42, 1970, the disclosure of which is incorporated herein by reference.

TABLE 1

| Hydrocarbon Solvent | Heat of Adsorption, kcal/mole |
| --- | --- |
| 2,2 dimethylbutane | 8.0 |
| cyclohexane | 8.7 |
| n-hexane | 10.4 |

TABLE 1-continued

| Hydrocarbon Solvent | Heat of Adsorption, kcal/mole |
| --- | --- |
| benzene | 9.8+ |

From Table 1, it can be seen that while aromatic hydrocarbons, cyclic hydrocarbons (e.g., cycloparaffins) and linear hydrocarbons (e.g., linear paraffins) can be employed as the hydrocarbon solvent, branched hydrocarbons are the most preferred solvent since they have the lowest adsorptivity on carbon. By branched hydrocarbon is meant a hydrocarbon having at least one tri-substituted carbon atom, at least one tetra-substituted carbon atom, or mixtures thereof. By tri-substituted carbon atom is meant a carbon atom that is bonded to three other carbon atoms, e.g.,

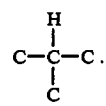

For example, in the case of heptanes, heptanes having tri-substituted carbon atoms include 2-methylhexane; 3-methylhexane; 2,3-dimethylpentane, 2,4-dimethylpentane and 3-ethylpentane. Similarly, a tetra-substituted carbon atom is a carbon atom that is bonded to four other carbons, e.g.,

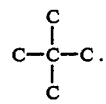

Heptanes having tetra-substituted carbon atoms include 2,2-dimethylpentane and 3,3-dimethylpentane. The heptane 2,2,3-trimethylbutane contains both tri-substituted and tetra-substituted carbon atoms. Branched hydrocarbons having at least one tetra-substituted carbon atom are preferred.

Only a portion of the branched hydrocarbon solvent molecule need be branchy. For example, hydrocarbons of the form RX where R is a branchy group and X is a non-branchy group can be suitably employed. Thus, hydrocarbon solvents such as tert-butyl benzene can be suitably employed.

The liquid solvent may also contain other than carbon-hydrogen bonds. By way of illustration, branched hydrocarbon solvents containing oxygen, sulfur and nitrogen can also be suitably employed. Examples of such branched hydrocarbons include di-isopropyl ether, di-t-butyl ether and t-butyl amine. Among hydrocarbon solvents containing oxygen, sulfur or nitrogen groups, the preferred solvents are those having the branched hydrocarbon group immediately adjacent to the oxygen, sulfur or nitrogen atom (e.g., t-butyl amine). Thus, it is clear that the branched hydrocarbon solvent employed herein may be selected from a wide variety of hydrocarbons and is limited only in that it must contain at least one tri-substituted carbon atom, at least one tetra-substituted carbon atom or mixtures thereof.

It is also preferred that the liquid solvent have a molecular weight such that the desorbed materials can be readily separated therefrom by stripping or distillation. Also, it is preferred that the solvent have a normal boiling point at a temperature significantly higher or significantly lower (e.g., about 30° F. or more) than the normal boiling range of the desorbed species.

Regeneration via solvent extraction should be effected under conditions such that the solvent will be maintained in substantially the liquid phase. This will, of course, depend on the boiling point of the particular solvent at the regeneration pressure employed as well as various economic considerations. Typically, the regeneration via solvent extraction should be effected at temperatures ranging from about 70° to about 700° F., preferably from about 100° to about 500° F. However, if the heat of adsorption of the solvent is lower than the heat of adsorption of the adsorbate, higher temperatures (within the ranges given above) will tend to increase the effectiveness of the solvent in displacing the adsorbate. The pressure during regeneration is not critical and will normally vary between about 0 and 200 psia, preferably between 0 and 50 psia. The contact or residence time required need only be that sufficient to regenerate the $C_xS$, i.e., to obtain $C_xS$ that possesses a greater capacity to adsorb the organic species from gas mixtures than that possessed by the spent $C_xS$. Thus, the contact time may vary from a few minutes to 2 hours or more. Typically, it will range from 5 to about 30 minutes.

Solvent plus desorbed species are then removed from the zone 12 via line 34 and passed into a separation zone 36 (say, a fractionation zone) wherein said solvent is recovered overhead in line 38 and the adsorbate recovered in line 40, assuming the solvent boils at a lower temperature than the adsorbate.

If desired, solvent remaining on the $C_xS$ adsorbent after regeneration via solvent extraction may be removed therefrom by stripping with a vapor introduced into zone 12 via line 32. Suitable stripping vapors include steam, light hydrocarbon gas ($C_1$-$C_4$), inert gas (e.g., nitrogen), air, alcohols and the like. Steam is a preferred stripping vapor. The stripping can be done at temperatures ranging from about 70° to about 1200° F., preferably from about 300° to about 700° F.

The adsorbate may also be removed from the $C_xS$ by direct contact with a stripping gas entering zone 12 via line 32. In this preferred embodiment, the adsorbate is stripped from the $C_xS$ and passed via line 34 into separation zone 36 wherein the stripping gas and said adsorbate are separated from one another. If desired, the stripping gas can be recycled via line 32.

Preferably the stripping gas will have a normal boiling point below that of the adsorbate to facilitate separation of the stripping gas therefrom. It is also preferred that the stripping gas be inexpensive, stable during regeneration and non-reactive with the $C_xS$ or the materials of construction. Suitable stripping vapors include those noted above as well as vaporized hydrocarbon solvent.

Regeneration via stripping should be effected at the stripping temperatures given above. As with regeneration via solvent extraction, higher temperatures (within the ranges given above) will tend to increase the effectiveness of the stripping gas in removing the adsorbate if the heat of adsorption of said stripping gas is lower than that of the adsorbate. The pressure during regeneration is not critical and will normally vary within the range of about 0 to about 3000 psia. In general, the pressure during regeneration will be equal to or lower than the adsorption pressure. The contact or residence time required need only be that sufficient to regenerate the $C_xS$. Thus, the contact time may vary from 1 minute to 2 hours or more. Typically, it will range from 10 to about 60 minutes.

Adsorbate can also be removed from spent $C_xS$ thermally, i.e., by heating to an elevated temperature. The particular temperature employed is not critical and will vary with a variety of process and economic factors such as the binding energy of the adsorbate on the $C_xS$, the rate of desorption and the like. However, the temperatures should be maintained below 1300° F. to avoid any deleterious effects on the $C_xS$. Preferably, the temperature will range between about 70° and about 1200° F., more preferably between about 150° to about 700° F. Pressures and contact times will vary within the ranges given above for regeneration via stripping.

It is preferred that thermal regeneration be carried out in the absence of oxidizing agents (e.g., oxygen) to avoid oxidation of the sulfur in the $C_xS$. It is also preferred that thermal regeneration be effected in the absence of reducing agents (e.g., hydrogen) to avoid reducing the sulfur. However, oxygen can be employed at temperatures below about 500° F. while hydrogen can be employed at temperatures below about 400° F. However, should a carrier gas be employed to supply heat during thermal regeneration, the use of an inert gas (such as nitrogen) is preferred, the gas entering zone 12 via line 32. The organic species thus removed from the $C_xS$ can then be passed from zone 12 via line 34 and may be recovered by, say, condensation.

Yet another method for regenerating the spent adsorbent is by so-called "pressure swing desorption" or "pressure reduction". Briefly, the organic vapors are adsorbed at higher pressures (typically about 300 to about 1500 psia) and then desorbed at lower pressures (e.g., about 20 to about 200 psia). Typically, the pressure ratio of adsorption to desorption is at least 2:1. According to this method, there is essentially no change in temperature except for that caused by the heats of adsorption and desorption. The desorbate is then removed from zone 12 as a vapor and may be recovered as such or condensed to form a liquid. If desired, residual desorbate may be stripped from the $C_xS$ at the conditions described above.

Thus, regenerating the adsorbent according to any of the methods described herein is that the adsorbate can be recovered as a by-product stream. As such, each of the regeneration methods can be employed to produce a concentrated stream of organic species that were present initially in the gas mixture in only dilute concentrations.

The present invention can be carried out in any apparatus suitable for gas adsorption. Equipment most suitable for a specific application is beyond the scope of the present invention and can be readily selected by one skilled in the art. Similarly, suitable materials of construction for adsorption processes would also be known to one skilled in the art. For example, solvents which do not decompose can usually be handled in plain steel equipment. However, special construction materials (e.g., copper, Everdur, Monel and stainless steel) may be required for other solvents.

This invention will be further understood by reference to the following examples which are not intended to unduly restrict the limits of the claims appended hereto.

EXAMPLE 1—ADSORPTION OF BUTANE GAS

Adsorptions of butane gas by $C_xS$ materials and activated carbons were measured at 24° C. in a Fisher Model 260F thermal gravimetric analyzer equipped with a Cahn electrobalance. The adsorbents used in this experiment are listed in Table 2 below along with their surface area as measured by the Brunauer-Emmett-Teller equation for physical adsorption of nitrogen (i.e., BET-$N_2$ test) and the total pore volume as determined by measuring the desorption isotherms of nitrogen at 77° K.and using numerical relationships developed by B. R. Roberts, *J. Colloid Interface Sci.*, Vol. 23, p. 266 (1957), the disclosures of which are incorporated herein by reference. The range of adsorbent particle size is also provided.

TABLE 2

| $C_xS$ Compounds From | x in $C_xS$ | Particle Size microns | Surface Area m²/g | Total Pore Volume cc/g |
|---|---|---|---|---|
| Polyvinylidene difluoride (PVDF) | 8.1 | 150–250 | 1048 | 0.642 |
| Carbon I | 7.6 | 150–250 | 771 | 0.627 |
| Carbon II | 27.1 | <38 | 2560 | 1.250 |
| Conventional Carbons | | | | |
| Carbon I | — | 150–250 | 1369 | 0.952 |
| Carbon II | — | <38 | 2603 | 1.252 |
| Carbon III | — | >250 | 1302 | 0.963 |

Figure 2:
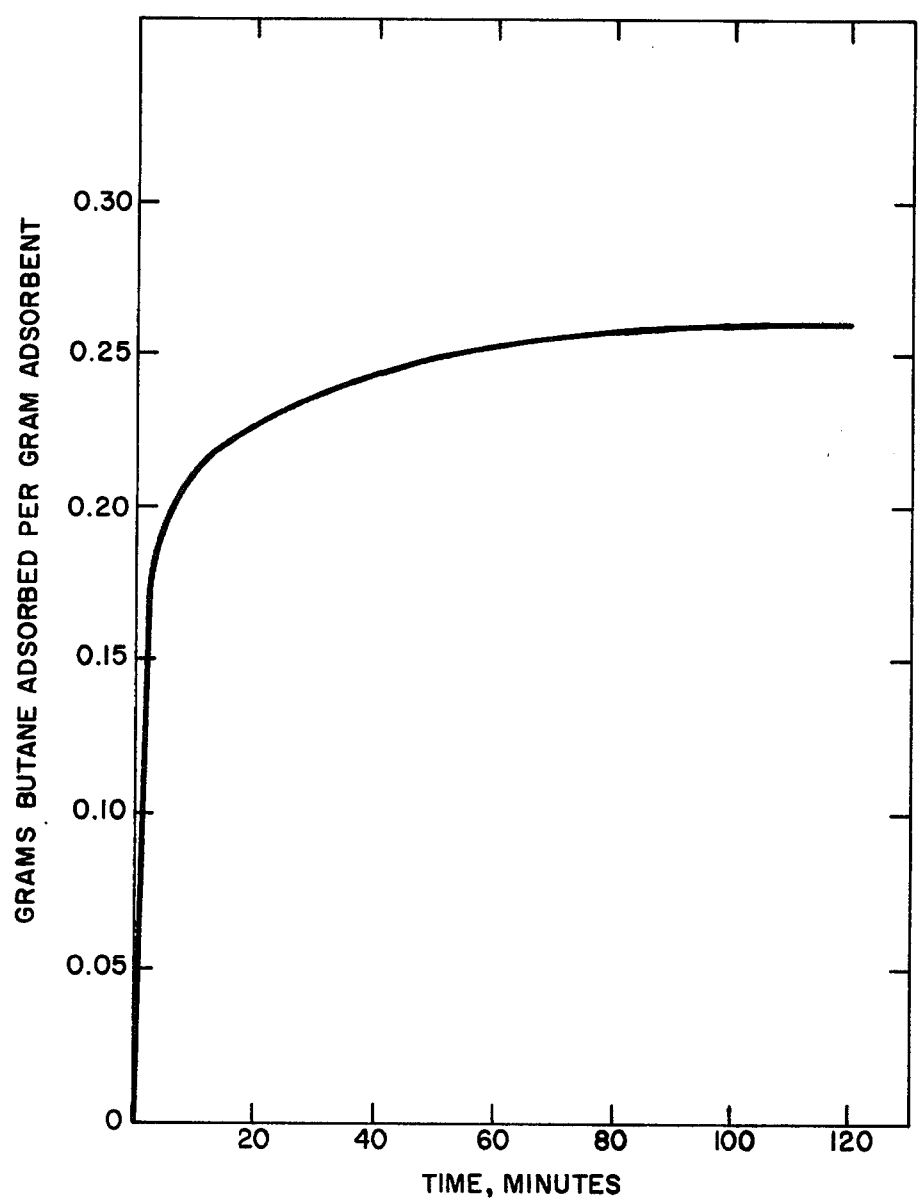
FIG. 2 shows an adsorption curve for the adsorption of butane on $C_xS$.

About 10 mg of each adsorbent was placed in a platinum basket. The weight gain of the adsorbent was monitored at the constant temperature with butane gas flowing at a rate of 150 cc/min. Under these experimental conditions, a constant weight was obtained in about two hours. The saturation capacity of the adsorbent for butane was determined by the total weight of butane adsorbed per unit weight of the adsorbent at the temperature. A typical adsorption curve is shown in FIG. 2 for $C_xS$ (PVDF). The saturation capacities measured for all adsorbents are shown in Table 3, along with the capacity ratio and surface area ratio using the saturation capacity and the surface area of Carbon I as a reference.

TABLE 3

| Adsorbent | Initial Sample Weight (mg) | Saturation Capacity (g/g) | Capacity Ratio | Surface Area Ratio |
|---|---|---|---|---|
| $C_xS$ (PVDF) | 11.472 | 0.262 | 0.87 | 0.77 |
| $C_xS$ (Carbon I) | 11.084 | 0.227 | 0.76 | 0.56 |
| $C_xS$ (Carbon II) | 9.316 | 0.653 | 2.18 | 1.87 |
| Carbon I | 9.272 | 0.300 | 1.00 | 1.00 |
| Carbon II | 8.724 | 0.568 | 1.89 | 1.90 |
| Carbon III | 11.888 | 0.274 | 0.91 | 0.95 |

The example shows the saturation capacity of the activated carbon is related to the BET surface area and the $C_xS$ material has a capacity higher than that of the activated carbon with the same surface area.

EXAMPLE 2—TEMPERATURE EFFECT ON THE ADSORPTION OF BUTANE GAS

Following the procedure of Example 1, adsorptions of butane from the gas phase by Carbon I, Carbon II, $C_xS$ (PVDF) and $C_xS$ (Carbon II) were measured at 65° C. The saturation capacities of each adsorbent at 24° and 65° C. are shown in Table 4 along with the capacity ratio. The capacity ratio is defined as the saturation capacity of each adsorbent at 65° C. relative to the saturation capacity of the same adsorbent at 24° C.

TABLE 4

| Adsorbent | Saturation Capacity (g/g) 24° C. | Saturation Capacity (g/g) 65° C. | Capacity Ratio |
|---|---|---|---|
| $C_xS$ (PVDF) | 0.262 | 0.202 | 0.77 |
| $C_xS$ (Carbon II) | 0.653 | 0.506 | 0.77 |
| Carbon I | 0.300 | 0.243 | 0.81 |
| Carbon II | 0.568 | 0.515 | 0.91 |

The example shows that temperature has a larger effect on the saturation capacity of $C_xS$ than that of the activated carbon. This indicates that the binding energy between butane and $C_xS$ is lower than that between butane and conventional activated carbon.

EXAMPLE 3—ADSORPTION OF GASOLINE VAPOR BY $C_xS$ MATERIALS AND ACTIVATED CARBON

Following the procedure of Example 1, adsorptions of gasoline vapor by Carbon I, Carbon II, $C_xS$ (Carbon I) and $C_xS$ (Carbon II) were measured at 24° C. Instead of flowing butane gas as described in Example 1, the adsorbents were held in an atmosphere of gasoline vapor which was in equilibrium with liquid gasoline at the temperature in the closed system. The saturation capacities for all adsorbents measured are listed in Table 5 for comparison.

TABLE 5

| Adsorbent | Saturation Capacity (g/g) | Capacity Ratio |
|---|---|---|
| $C_xS$ (Carbon I) | 0.321 | 0.75 |
| $C_xS$ (Carbon II) | 0.798 | 1.87 |
| Carbon I | 0.426 | 1.00 |
| Carbon II | 0.714 | 1.68 |

The example shows that $C_xS$ materials also adsorb gasoline vapor which is a mixture of gaseous hydrocarbons.

EXAMPLE 4—TEMPERATURE EFFECT ON THE ADSORPTION OF GASOLINE VAPOR

Following the procedure of Example 3, adsorptions of gasoline vapor by Carbon I, Carbon II, $C_xS$ (Carbon I) and $C_xS$ (Carbon II) were measured at 45° C. The saturation capacities of each adsorbent at 24° C. and 45° C. are shown in Table 6 along with the capacity ratio which is defined as the saturation capacity of each adsorbent at 45° C. relative to the saturation capacity of the same adsorbent at 24° C.

TABLE 6

| Adsorbent | Saturation Capacity (g/g) 24° C. | Saturation Capacity (g/g) 45° C. | Capacity Ratio |
|---|---|---|---|
| $C_xS$ (Carbon I) | 0.321 | 0.272 | 0.85 |

TABLE 6-continued

| Adsorbent | Saturation Capacity (g/g) | | Capacity Ratio |
|---|---|---|---|
| | 24° C. | 45° C. | |
| $C_xS$ (Carbon II) | 0.798 | 0.669 | 0.84 |
| Carbon I | 0.426 | 0.382 | 0.90 |
| Carbon II | 0.714 | 0.708 | 0.99 |

The example shows that temperature has a larger effect on the saturation capacity of $C_xS$ than on that of activated carbon for the adsorption of gasoline vapor. This indicates that the binding energy between gasoline vapor and $C_xS$ is lower than that between gasoline and conventional activated carbon.

EXAMPLE 5—REGENERATION OF ADSORBENTS LOADED WITH BUTANE BY PURGING WITH AIR OR INERT GAS

Following the procedure of Example 1, adsorbents were first loaded with butane. After the adsorbent was saturated with butane, air or inert gas such as argon was introduced to purge the sample at a flow rate of 300 cc/min for a period of one hour. No measurable differences for the adsorbent were observed using either air or argon. Regenerations under these experimental conditions were measured for Carbon I, Carbon II, $C_xS$ (Carbon I) and $C_xS$ (Carbon II) as shown in Table 7.

TABLE 7

| Adsorbent | Saturation Capacity (g/g) | % Regeneration |
|---|---|---|
| $C_xS$ (Carbon I) | 0.227 | 58.2 |
| $C_xS$ (Carbon II) | 0.653 | 45.2 |
| Carbon I | 0.300 | 49.3 |
| Carbon II | 0.568 | 42.8 |

The example shows that $C_xS$ materials and activated carbons loaded with butane can be regenerated by purging with air or inert gas at room temperature. $C_xS$ materials can be regenerated more completely compared with their starting activated carbons under the same regeneration conditions.

EXAMPLE 6—REGENERATION OF ADSORBENTS LOADED WITH GASOLINE BY PURGING WITH INERT GAS

Following the procedure of Example 3, adsorbents were first loaded with gasoline. After the adsorbent was saturated with gasoline, argon was introduced to purge the sample at a flow rate of 300 cc/min for a period of two hours. Regenerations under these experimental conditions were measured for Carbon I, Carbon II, $C_xS$ (Carbon I) and $C_xS$ (Carbon II) as shown in Table 8.

TABLE 8

| Adsorbent | Saturation Capacity (g/g) | % Regeneration |
|---|---|---|
| $C_xS$ (Carbon I) | 0.321 | 44.5 |
| $C_xS$ (Carbon II) | 0.798 | 29.1 |
| Carbon I | 0.425 | 40.4 |
| Carbon II | 0.714 | 33.2 |

The example shows that $C_xS$ materials and activated carbon loaded with gasoline can be regenerated by purging with argon at room temperature.

EXAMPLE 7—TEMPERATURE EFFECT ON THE REGENERATION OF ADSORBENTS LOADED WITH GASOLINE

Following the procedure of Example 6, the adsorption and regeneration were measured at 45° C. for the adsorption of gasoline vapor. Results of the measurements are shown in Table 9.

TABLE 9

| Adsorbent | Saturation Capacity (g/g) | % Regeneration |
|---|---|---|
| $C_xS$ (Carbon I) | 0.272 | 60.3 |
| $C_xS$ (Carbon II) | 0.669 | 47.7 |
| Carbon I | 0.382 | 55.2 |
| Carbon II | 0.708 | 45.3 |

The example shows that temperature has a larger effect on the regeneration of $C_xS$ materials than on the regeneration of activated carbons.

What is claimed is:

1. A process for regenerating a nonstoichiometric carbon-sulfur compound of the formula $C_xS$, where x ranges from about 4 to about 15, the adsorptive capacity of said compound having become reduced due to the adsorption of organic vapors thereon, which comprises removing at least a portion of said adsorbed vapors from said nonstoichiometric carbon-sulfur compound.

2. The process of claim 1 wherein x ranges from about 4 to about 10.

3. The process of claim 1 wherein the $C_xS$ has a surface area ranging between 300 and 2500 square meters per gram and a pore volume of at least 0.2 cubic centimeters per gram.

4. The process of claim 1 wherein said removal is effected by contacting said nonstoichiometric carbon-sulfur compound with a stripping gas.

5. The process of claim 4 wherein said stripping gas is selected from the group consisting of steam, inert gas, alcohols and mixtures thereof.

6. The process of claim 5 wherein said stripping gas comprises steam.

7. the process of claim 1 wherein said removal is effected by heating said compound to a temperature between about 70° and about 1200° F.

8. The process of claim 7 wherein said compound is heated to a temperature between 150° and 700° F.

9. The process of claim 7 wherein an inert gas is used as a heat carrier.

10. The process of claim 1 wherein said removal is effected by contacting said compound with a liquid solvent.

11. The process of claim 10 wherein said liquid solvent is a hydrocarbon.

12. The process of claim 11 wherein said liquid solvent is a branched hydrocarbon having at least one trisubstituted carbon atom, at least one tetra-substituted carbon atom or mixtures thereof.

13. The process of claim 10 wherein the temperature during said contacting ranges from about 70° to about 700° F.

14. The process of claim 10 wherein the organic vapors removed from said nonstoichiometric carbon-sulfur compound are recovered from said liquid solvent.

15. A process for removing organic vapors from a gaseous mixture which comprises
    (a) contacting said mixture with a nonstoichiometric carbon-sulfur compound of the formula $C_xS$, where x ranges from 4 to about 15, said compound having a surface area of at least 300 square meters per gram, for a period of time sufficient to adsorb at least a portion of said organic vapors from said mixture onto said compound, thereby reducing the adsorptive capacity of said compound, (b) regenerating said nonstoichiometric carbon-sulfur compound by removing at least a portion of said organic vapors from said compound.

16. The process of claim 15 wherein x ranges from 4 to about 10.

17. The process of claim 15 wherein the $C_xS$ has a surface area ranging from 300 to about 2500 square meters per gram and a pore volume of at least 0.2 cubic centimeters per gram.

18. The process of claim 15 wherein said organic vapors are selected from the group consisting of aromatic hydrocarbons, phenolic hydrocarbons, halogenated hydrocarbons, nitrated hydrocarbons and mixtures thereof.

19. The process of claim 18 wherein said removal is effected by contacting said carbon-sulfur compound with a liquid hydrocarbon solvent.

20. The process of claim 15 wherein the contacting in (a) is effected at a pressure ranging from about 300 to about 1500 psia and the regeneration in (b) is effected at a pressure ranging between about 0 to about 200 psia.

21. The process of claim 15 wherein the pressure ratio of the contacting in (a) to the regeneration in (b) is at least 2:1.

* * * * *